Patented July 6, 1943

2,323,481

UNITED STATES PATENT OFFICE 2,323,481

CHEMICAL PROCESS AND COMPOSITION

David M. McQueen, Wilmington, Del., assignor, by mesne assignments, to E. I. du Pont de Nemours & Company, Wilmington, Del., a corporation of Delaware No Drawing. Application March 14, 1939,
Serial No. 261,794

12 Claims. (Cl. 95—88)

This invention relates to color photography. More particularly it relates to photographic emulsions and developer solutions containing condensation products obtained by the action of a difunctional resin forming reagent with hydroxy aromatic, carboxylic or sulfonic acids and their salts. Still more particularly it relates to such compositions containing aldehyde-hydroxyaromatic acid condensation products as color formers. Still further the invention relates to dyes produced by the use of such color formers or coupling components. The invention further relates to methods for producing dye images by utilizing aforedescribed condensation products.

This invention has for an object the production of developer solutions and emulsions which contain stable color formers which are capable of forming dyes of good tinctorial strength and color. A further object is the preparation of photographic emulsion layers which contain color formers capable of forming bright haze-free dye images. A still further object is the production of photographic emulsions which contain immobile color-formers which do not affect the sensitivity of photographic emulsions. Still other objects will appear hereinafter.

The above and other objects are accomplished by the preparation and use in photographic emulsions and processing solutions, particularly developing solutions of condensation products of aromatic carboxylic or sulfonic acids or salts thereof which are substituted by a hydroxyl group in the para position with difunctional resin forming reagents. In carrying out one important embodiment of the invention the aldehyde-hydroxyaromatic acid condensation products are dissolved in a suitable medium such as dilute aqueous alkali solutions and incorporated in a photographic emulsion.

In carrying out another important embodiment of the invention the aldehyde-hydroxyaromatic acid condensation products are dissolved in a dilute aqueous alkali solution and incorporated into a developer solution.

The color formers used according to this invention are prepared by reacting an aromatic carboxylic or sulfonic acid which is substituted by a hydroxyl group in the para position with a difunctional condensation or resin forming reagent, e. g. formaldehyde, acetaldehyde, propionaldehyde, benzaldehyde, or substances capapable of yielding such aldehydes; chloroform; dimethylol derivatives of phenols, amides, amines, etc., whereby a condensation product soluble in dilute aqueous alkaline solutions is formed. The condensation products may be heated to increase their molecular weight; however, the heating should be stopped short of gelation.

The condensation products are then introduced into photographic emulsions or processing solutions as previously described and dyes are produced therefrom by some suitable treatment, such as exposure and development with a color coupling developer, or treatment with a diazo compound followed by localized bleaching of the dye in the image areas as is known in the art. In the case of emulsions the condensation products are first dissolved in dilute aqueous alkali or carbonate solutions. Small amounts of organic solvents, e. g. alcohol or acetone may be added.

The starting phenolic acids should have two reactive positions available for resin formation and this demands in general that the positions ortho to the hydroxyl group, which is itself para to the acidic group, must be free. Suitable compounds include 4-hydroxybenzoic acid, 2,4-dihydroxybenzoic acid, 2-chloro-4-hydroxybenzoic acid, 4-hydroxybenzenesulfonic acid, 2,4-dihydroxy-benzene-sulfonic acid, 2-methoxy-4-hydroxybenzoic acid, 2-ethoxy-4-hydroxybenzenesulfonic acid, 1,4-naphthalsulfonic acid, and 1,8-dihydroxynaphthalene-4-sulfonic acid.

The invention will be further illustrated but is not intended to be limited by the following examples in which the parts stated are parts by weight.

Example I

Fifty parts p-hydroxybenzoic acid, 27 parts of a 37% (by weight) aqueous formaldehyde solution, 68 parts water and 1 part ammonium chloride were refluxed for a total of 21 hours. Upon chilling, a white solid of comparatively low molecular weight, separated out and, after freeing from excess water, it was heated for two hours at 150° C. to increase mol. weight, but stopping short of gelation. This product was incorporated in a panchromatic emulsion by first dissolving it in dilute sodium carbonate solution containing a small amount of alcohol and mixing it into the preformed emulsion. Upon exposure and development with p-aminodiethylaniline, a blue-green picture was formed.

Example II

The low molecular weight white solid mentioned in Example I, without further heating, was dissolved in dilute sodium carbonate solution and incorporated in a developer of the following composition:

| | Parts |
|---|---|
| p-Aminodiethylaniline hydrochloride | 2 |
| Sodium carbonate | 10 |
| Sodium sulfite | 5 |
| Water | 983 | in the ratio of 2 parts of resin to 1000 parts of developer. A strip of film bearing a positive (or silver salt) image was immersed therein for 15 minutes. After washing thoroughly, the film was bleached in 4% potassium ferricyanide solution, washed and fixed in 40% hypo solution. A blue-green picture resulted from this treatment.

Incorporation of the starting material, p-hydroxy-benzoic acid, in the color developer and development of an image therein yielded no color whatsoever.

Example III

Twenty-five parts p-hydroxybenzoic acid, 13 parts of 37% aqueous formaldehyde solution, 34 parts water, 1.19 parts concentrated hydrochloric acid (specific gravity 1.19) were refluxed for four hours and fifteen minutes. After chilling and filtering, the precipitate was separated from the low molecular weight product by washing with water and incorporated in a photographic emulsion after first dissolving it in 5% sodium carbonate solution. The film was exposed and developed with a Metol-hydroquinone developer, washed and treated with a solution of diazotized p-nitraniline. This treatment produced an orange-yellow dye throughout the film. A yellow positive image may be produced from this film by one of the selective bleaching methods described in the art, e. g., that of Britsh Patent 133,034, and U. S. Patent 1,517,049.

Example IV

Twenty-five parts p-hydroxybenzoic acid, 13 parts of a 37% aqueous formaldehyde solution, 34 parts water and 5 parts of 20% sodium hydroxide solution were refluxed for a total of 77 hours. After cooling, excess water was removed from the solid and heating was continued overnight on a steam bath. A hard, light brown resin soluble in dilute sodium carbonate solution was obtained. This was incorporated in a panchromatic emulsion and coated on a cellulose acetate support. The film was exposed, developed in a Metol-hydroquinone developer and bleached with a potassium dichromate-sulfuric acid bath. The firm was re-exposed, developed with p-aminodiethylaniline, bleached with potassium ferricyanide solution and fixed. A clear, bright blue-green image was obtained.

Example V

Twenty parts sodium phenolsulfonate, 5.4 parts of 37% aqueous formaldehyde solution, and 20 parts water were refluxed for 24 hours. A red-brown resin was obtained which was soluble in dilute sodium carbonate solution. When placed in a p-aminodiethylaniline color developer according to the procedure mentioned in Example II and the mixed bath used to develop an image, a deep blue picture was obtained after clearing of silver and silver salts. By heating the resin obtained after refluxing, it can be made quite insoluble.

The starting material, sodium phenolsulfonate, tested in analogous fashion, gives no color whatsoever.

Example VI

Twelve and five-tenths parts of Neville and Winther's salt, (1,4-naphthol sodium sulfonate) was dissolved in a mixture of 40 parts water and 8.6 parts 37% aqueous formaldehyde solution. The solution was made just acid to litmus with acetic acid and refluxed for a period of three hours. The resin was freed from excess water and heated for one-half hour at 140° C. After washing and drying, the resin was dissolved in dilute sodium hydroxide containing a small amount of alcohol and coated in a photographic emulsion. After exposure and development with p-aminodiethylaniline, a deep blue color was obtained.

In common with the high molecular weight resins of the preceding examples, this dye-forming resin remains immobile in photographic emulsion layers and does not migrate out into the alkaline processing baths used in bringing up color in the film.

Example VII

Twenty-eight parts 2,4-dihydroxybenzoic acid, 13.5 parts of 37% aqueous formaldehyde solution, 35 parts of water and 0.5 part ammonium chloride were refluxed for a period of 8 hours. A brownish, brittle resin was obtained which was freed from excess water and heated for 6 hours at 150–170° C. The resin obtained is soluble in dilute aqueous alkali. When introduced in a photographic emulsion and developed with p-aminodiethylaniline a deep blue color is obtained. This resin is quite immobile in emulsion layers.

As may be apparent from a consideration of the preceding examples, the operative limits of temperatures, proportions of reactant materials, duration of reaction utilized in the presence of the resinous dye intermediates, etc., may be widely different. In general, the time of heating is determined by the solubility desired in the final product. For example, if the final product is desired to be of such low molecular weight that it can penetrate gelatin layers, and thus be suitable for use in color developer, the reaction is run under mild conditions, i. e., short period of heating, weakly acid or alkaline catalyst, etc. On the other hand, if it is desired to have a product which is non-migratory in photographic emulsion layers, i. e., so that it does not diffuse through gelatin, the reaction is carried much further and, in fact, can be continued until a point just short of gelation of the resin.

The starting aromatic, carboxylic or sulfonic acids or salts thereof are substituted in the 4-position with a hydroxyl group and should further have two available reactive positions for resin formation. Beyond this, other substituents may be as desired, i. e., the amine, amide, halogen, alkyl, aryl, aralkyl, alkoxy, aryloxy, nitro, hydroxy or other group, which does not too drastically inhibit resin formation. Of these, alkoxy, halogen, hydroxyl and amide groups are preferred substituents. In place of formaldehyde, derivatives such as hexamethylenetetramine, capable of yielding formaldehyde can be used. Furthermore, other aldehydes such as acrolein, acetaldehyde, glyoxal, benzaldehyde, etc. can be employed. In certain cases compounds containing active halogen atoms can be used in place of formaldehyde. Such compounds are chloroform, sulfur dichloride and phosphorus oxychloride. Dimethylol derivatives of phenols, amides, amines, etc. such as dimethylol urea, dimethylolguanidine and 2,6-dimethylol-4-methylphenol also have utility.

The catalysts employed are the usual catalysts known in the art of making phenolic resins. In general, they may be either acidic or alkaline in nature, such as hydrochloric acid, p-toluenesulfonic acid, sulfuric acid, sodium hydroxide, ammonium hydroxide or potassium hydroxide. Readily hydrolyzed salts, such as ammonium chloride or sodium acetate may also be employed.

The dye intermediates used in this invention are not limited in their utility to any one process of color photography. They are suitable for dye coupling development with p-phenylenediamine derivatives, and by suitably controlling the molecular weights of the products, they may be used in the color developer or in the photographic emulsion. Furthermore, the dye components of this invention couple with diazo compounds, so that they are therefore suitable for transforming into azo dyes, followed or not by differential bleaching in the presence of silver images as is known in the art.

The preferred developing agents in the process of dye coupling development are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylenediamine itself, p-methylaminoaniline, p-ethylaminoaniline, para-aminophenol, N,N-d'-ethyl-o-phenylenediamine, chloro-p-phenylenediamine, 1,2,5-toluylenediamine, 2-amino-5-diethylamino-toluene, N-p-aminophenylpiperidine, N-methyl-N-hydroxyethyl-p-phenylene diamine, N-butyl-N-hydroxyethyl-p-phenylenediamine, β-γ - dihydroxypropyl - p-phenylenediamine, etc. These aromatic amino-developing agents may be used in the form of their salts, wh'ch may be either inorganic or organic. The salts are in general more stable than the free bases. As examples of suitable salts mention is made of the hydrochloride, sulfates, acetates, etc.

The condensation products or dye intermediates used in the present invention may also be incorporated in colloid layers sensitized by treatment with bichromate. Any colloid capable of this sensitization may be used, as, for example, gelatin, gum Arabic, glue or albumen. Appropriate methods of developing dye images after exposure then include the process of removal of the unexposed colloid with hot water and dye development of the exposed portions with p-nitrosoaniline or its derivatives and the process of development with dye coupling developers.

It has been mentioned that certain of the phenols upon which a condensation formation is carried out, e. g., p-hydroxybenzoic acid, give no color when treated with oxidized p-aminodiethylaniline. It is, therefore, a surprising fact that when resinification is carried out with, for example, formaldehyde, a coupling product is obtained. The structure of the resin obtained is believed to be represented by

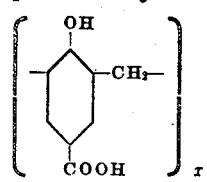

and it is thus seen that in resinification the two reactive positions ortho to the phenolic hydroxyl group are blocked with formaldehyde residues. It would therefore be predicted in advance that the resin would be less apt to couple than the starting material. It is believed that, during the coupling reaction with oxidized p-amino-diethylaniline, the carboxyl group is eliminated and that the dye obtained, in this case, has the following probable structure:

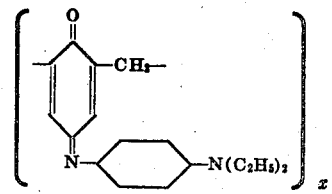

Similarly, with condensation products from phenol-sulfonic acid, the sulfonic acid group is believed to be eliminated in the coupling reaction and the resulting dye is thought to have the same structure. The structures for the uncoupled and coupled formaldehyde condensation products are thus believed to be:

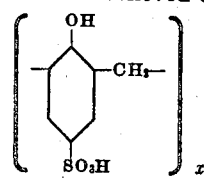

and

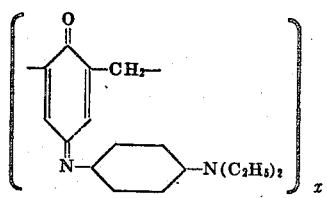

It is evident, then, that the introduction of the methylene bridges upon condensation with formaldehyde exerts an activating influence upon this eliminative coupling. If the carboxyl group is not para to the phenolic group as in a salicylic acid-formaldehyde resin, this activating influence does not appear, since only very weak colors are obtained. The low color value of this resin is ascribed to the fact that eliminative coupling does not take place and that the color is due to coupling with the small amount of terminal groups containing free para positions so that the dye is believed to arise from end groups of the following structure:

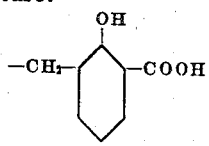

and probably has the structure

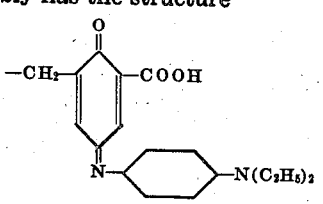

The very weak colors associated with condensation products from hydroxyaromatic acids in which the acidic group is not para to the hydroxyl illustrates the effect obtained when the para positions in the bulk of the condensation products are occupied by groups not subject to eliminative coupling. Thus, the acidic group serves the dual purpose of preventing the occupation of the reactive positions by groups which hinder coupling and of making the resulting resin soluble in dilute alkaline solution.

A major advantage of the process of the present invention is that these dye intermediates yield bright, intense, haze-free dye images when color-developed. This is apparently due in part to the presence of the carboxylic or sulfonic acid groups which promote solubility in weakly basic solutions such as dilute sodium carbonate solution. Since emulsions generally are also weakly basic, the dye-forming condensation products and emulsions are completely compatible, thus forming a desirable condition for the production of clear, haze-free colors. The virtue of the position of the acidic group para to the phenolic hydroxyl is again evident by comparison with condensation products from salicyclic acid and formaldehyde which yield very weak to no colors, depending upon the method of preparation.

It has previously been pointed out that many of the starting materials do not couple with oxidized p-aminodiethyl aniline before resinification and it is therefore a surprising fact that the condensation products not only couple but form bright, intense dyes. Another surprising fact is that, although the condensation products are soluble in weakly basic solutions, the high molecular weight products can be placed in photographic emulsions, and, thus incorporated, do not migrate under the influence of the alkaline processing baths customarily used in the processes of color photography. They can even be leached in sodium carbonate solution without the slightest trace of product being discernible in the leaching bath.

Contrary to what might be predicted upon the basis of present-day knowledge of the behavior of formaldehyde derivatives, these condensation products show no fogging properties in photographic emulsions. This fact is of major importance as is the inertness of the condensation products toward the sensitizing dyes customarily used in orthochromatic and panchromatic emulsions. The products can thus be used in emulsions specially sensitized to a limited region of the spectrum, as is customary in multi-layer color films, without impairing the over-all sensitivity characteristics of the film.

It has been pointed out that the products of this invention couple with diazo compounds to yield azo dyes. The high molecular weight resins may thus be incorporated in viscose dope and, after coagulation into fibers or films, color can then be produced throughout by treatment with diazo compounds, such as diazotized p-nitroaniline. Other cellulose derivatives such as low substituted cellulose ethers, e. g. methyl and ethyl cellulose, glycol cellulose, cellulose glycollates, etc., may be similary colored.

As many apparently widely different embodiments of this invention may be made without departing from the spirit and scope thereof, it is to be understood that we do not limit ourselves to the specific embodiments thereof except as defined in the appended claims.

I claim:

1. A photographic developer solution containing a color coupling aromatic amino developing agent and an alkali-soluble condensation product obtained by the action of an aldehyde upon a compound of the general formula:

wherein A is an acid radical selected from the group consisting of carboxylic and sulfonic acids and their water-soluble salts.

2. A photographic developer solution containing an aromatic amino developing agent containing an unsubstituted amino group and an alkali-soluble aldehyde-para-hydroxyaromatic carboxylic acid condensation product.

3. A photographic developer solution containing a color coupling aromatic amino developing agent and an alkali-soluble formaldehyde-para-hydroxyaromatic carboxylic acid condensation product.

4. The process which comprises developing an exposed silver salt image with an alkaline developer solution containing an alkali-soluble aldehyde-para-hydroxyaromatic carboxylic acid condensation product and a color coupling aromatic amino developing agent.

5. The process which comprises developing an exposed silver salt image with an alkaline developer solution containing an alkali-soluble formaldehyde-para-hydroxyaromatic carboxylic acid condensation product and an aromatic amino developing agent containing an unsubstituted amino group.

6. A photographic developer solution containing an aromatic amino developing agent having at least one unsubstituted amino group and an alkali soluble condensation product obtained by the action of formaldehyde upon a compound of the general formula:

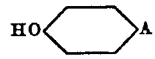

wherein A is an acid radical selected from the group consisting of carboxylic and sulfonic acids and their water-soluble salts, said condensation product being of such low molecular weight that it can penetrate gelatin layers.

7. A photographic developer solution containing a color coupling aromatic primary amino developing agent and an alkali-soluble formaldehyde para-hydroxybenzoic acid condensation product.

8. A photographic developer solution containing a color coupling aromatic primary amino developing agent and an alkali-soluble condensation product obtained by the action of formaldehyde upon sodium phenol sulfonate.

9. A photographic developer solution containing a color coupling aromatic primary amino developing agent and an alkali-soluble condensation product obtained by the action of formaldehyde upon 1,4-naphthol sodium sulfonate.

10. Process which comprises developing an exposed silver salt image with an aqueous alkaline developer solution containing an alkali-soluble para-hydroxybenzoic acid condensation product and a color coupling aromatic primary amino developing agent.

11. Process which comprises developing an exposed silver salt image with an aqueous alkaline developer solution containing an alkali-soluble condensation product obtained by the action of formaldehyde upon sodium phenol sulfonate and a color coupling aromatic primary amino developing agent.

12. Process which comprises developing an exposed silver salt image with an aqueous alkaline developer solution containing an alkali-soluble condensation product obtained by the action of formaldehyde upon 1,4-naphthol sodium sulfonate and a color coupling aromatic primary amino developing agent.

DAVID M. McQUEEN.